United States Patent Office 3,755,552
Patented Aug. 28, 1973

3,755,552
PROCESS FOR PRODUCING
HYDROGEN PEROXIDE
Nathan Dean Lee, Lambertville, N.J., and Wayne Edwin Schrock, Charleston, W. Va., assignors to FMC Corporation, New York, N.Y.
No Drawing. Filed Oct. 21, 1970, Ser. No. 82,802
Int. Cl. B01j 9/00; C01b 15/02
U.S. Cl. 423—588
1 Claim

ABSTRACT OF THE DISCLOSURE

Process for producing hydrogen peroxide by alternately, catalytically hydrogenating and oxidizing an anthraquinone working solution, wherein hydrogen and the working solution are passed in contact with a hydrogenation catalyst contained in a plurality of substantially vertically oriented cylinders and wherein the ratio of the diameter of each cylinder to the diameter of the catalyst particles is at least 15:1.

BACKGROUND OF THE INVENTION

(A) Field of the invention

This invention relates to producing hydrogen peroxide by the anthraquinone process in which an improved catalytic hydrogenation stage is utilized.

(B) Description of the prior art

It is known that anthraquinone compounds, e.g. 2-ethyl anthraquinone, and their tetrahydro derivatives can be used as working compounds in a process for producing hydrogen peroxide. In this process, commonly known as the anthraquinone process, a working compound is dissolved in a suitable solvent, or mixture of solvents, to form a working solution and is alternately reduced and oxidized. During the reducing stage, the working compound is hydrogenated in the presence of a catalyst to reduce it to its "hydroquinone" form. In the subsequent oxidation step the hydrogenated working compound is oxidized with air, oxygen or other oxygen-containing gases to convert it to its "quinone" form with concomitant formation of hydrogen peroxide. The hydrogen peroxide product is then removed from the working solution, preferably by extraction with water, and the remaining working solution is recycled to the hydrogenator to again commence the cyclic process for producing hydrogen peroxide. The detailed operation of this process is described fully in U.S. Pats. 1,158,525, 2,215,883 and 3,009,782.

In the above-described process, the catalytic hydrogenation conventionally is carried out in either a "fluid bed" or a "fixed bed." In a "fluid bed" the catalyst has a size of about 20 to 200 mesh (0.8 to 0.07 mm.) and is kept suspended in a portion of the working solution which is maintained in the hydrogenator. The working solution and hydrogen are passed through the catalytic hydrogenator continuously, and the suspended catalyst is mildly agitated to promote hydrogenation of the working solution. In a "fixed bed" the catalyst, normally having a size of 3 to 65 mesh (0.2 to 6 mm.), is supported in a fixed position, preferably between porous support plates or screens, and both hydrogen and the working solution are passed simultaneously through the supported catalyst mass either concurrently or countercurrently. In this system, the catalyst remains as a ridged, packed mass and is never suspended in the working solution.

One of the key steps in obtaining good hydrogen peroxide yields in the above process is the catalytic hydrogenation stage. In this stage both hydrogen gas and the anthraquinone working solution must be reacted together in the presence of a catalyst. While many improvements have been developed with respect to catalyst formulations and catalyst metals, little work has been carried out in altering the design or structure of the catalytic hydrogenator per se. One such improvement which has been made recently in fixed bed catalytic hydrogenator design, is set forth in my U.S. patent application Ser. No. 729,561, filed on May 16, 1968, now U.S. Pat. No. 3,565,581. Accordingly, it is the intent of the present invention to describe a process wherein the hydrogenating efficiency of a fixed bed catalytic hydrogenator stage can be substantially improved.

SUMMARY OF THE INVENTION

I have now found that in a continuous process for producing hydrogen peroxide, wherein a working solution (containing as essential ingredients an anthraquinone working compound dissolved in at least one working solvent) is alternately reduced and oxidized, a more effective catalytic hydrogenation can be carried out by passing the working solution and hydrogen in contact with one another through a fixed catalyst bed wherein the catalyst is contained in a plurality of substantially vertically oriented cylinders wherein the ratio of the diameter of the cylinder to the diameter of the catalyst particles is at least 15:1.

DESCRIPTION OF THE INVENTION AND THE PREFERRED EMBODIMENTS

In carrying out the present invention a working solution is made up containing an anthraquinone working compound, dissolved in a suitable, organic solvent. The compound must be capable of being alternately reduced and oxidized to produce hydrogen peroxide. The working solutions that can be used in the present process are those that contain anthraquinone working compounds such as 2-ethyl anthraquinone or the 2-isopropyl-, 2-sec-butyl-, 2,5-butyl-, 2-sec-amyl-, 2-methyl- or 1,3-dimethyl derivatives of anthraquinone as well as other anthraquinone well known in the hydrogen peroxide art. These working compounds are dissolved in at least one organic solvent to form the anthraquinone working solution; two or more mixed organic solvents may be used to enhance the solubility of an anthraquinone working compound in both its hydrogenated form, i.e. the "hydroquinone" form, and its oxidized form, i.e. the "quinone" form.

In accordance with the present process, the above anthraquinone working solution is passed into a catalytic hydrogenator along with gaseous hydrogen. The working compound dissolved in the working solution is subjected to reduction in the catalytic hydrogenator in the presence of a catalyst. The catalyst employed is most suitably a noble catalyst, such as palladium or platinum, deposited on an inert catalyst, such as palladium or platinum, deposited on an inert carrier. The carrier may comprise alumina, carbon, silica, silica alumina, calcium aluminum silicate, carbonates and the like.

The fixed bed catalytic hydrogenator is prepared by placing a plurality of substantially vertically oriented cylinders within a hydrogenator shell and filling the cylinders with the hydrogenation catalyst. The catalyst particles are supported within the vertically oriented cylinders by means of a perforated screen or other perforated support at the base of the cylinders which permits solution to be flowed through the catalyst residing within the cylinders. The working solution and hydrogen gas react in the presence of the catalyst as they are passed through the cylinders in contact with one another. The number of cylinders utilized in the hydrogenator is not critical, except that larger numbers of cylinders permit more catalyst to catalyze the hydrogenation reaction. However, the cylinders must have a minimum diameter, below which, practical flow rates and effective contact will not be obtained. This is defined by the ratio of the diameter of the cylinder to the diameter of the catalyst particles. This ratio should be at least 15:1.

The use of these vertically oriented cylinders to contain the catalyst appears to minimize channeling of the working solution and hydrogen gas through the fixed bed. In addition a more turbulent flow through the cylinders of both the gas and the liquid streams, without separation of the gas from the liquid, is obtained by this hydrogenator construction. Because of the greater reaction between the working solution and hydrogen a more efficient utilization of the working solution and catalyst can be achieved resulting in increased hydrogen peroxide production.

In the hydrogenation stage conventional temperatures and pressures known to be useful in reducing hydrogen peroxide by the anthraquinone process can be utilized. The instant fixed bed hydrogenator can be operated at pressures of between about 5 to about 100 p.s.i.g.; typically pressures of between about 30 to 60 p.s.i.g. are utilized. Although superatmospheric pressures are preferred, the process can be operated at atmospheric pressure and in some cases at subatmospheric pressure. The hydrogenator can be operated at temperatures of between ambient (about 20° C.) up to 150° C.; typically fixed bed operations are normally between 20 to about 70° C., and preferably at temperatures of about 45 to about 55° C.

Under the normal conditions of operation, the proportion of working compound which is hydrogenated per pass (depth of hydrogenation) through the catalytic hydrogenator normally is at least about 40 up to 80%. If higher depths of hydrogenation are desired, these may be carried out readily, but with some increase in the formation of degradation products.

The working solution after leaving the catalytic hydrogenator is passed into an oxidizer where it is contacted with air or oxygen. In the normal mode of operation, the working solution flows continuously into the base of an oxidizing tank and is removed as oxidized overflow through a standpipe at the top of the oxidizing vessel. Air, oxygen, or other oxygen containing gas is pumped into diffusers or other gas dispersing means located at the base of the oxidizing vessel and is released as a continuous upward flow of dispersed bubbles passing through the working solution. The oxidation reaction normally takes place at superatmospheric pressures, although subatmospheric or atmospheric pressures may be employed in the oxidizer. Temperatures are from about ambient (about 20° C.) up to about 65° C. can be employed in the oxidizer, although 45 to 55° C. is preferred. During this oxidation stage, the anthraquinone working compound is oxidized to its "quinone" form with concomitant release of hydrogen peroxide.

The oxidized mixture is removed from the oxidizer and subjected to water extraction in a conventional extractor to dissolve the hydrogen peroxide, preferentially, in the aqueous extract phase. Raffinate and water extract are then permitted to separate into an organic phase and a water phase. The water phase, containing most of the hydrogen peroxide, is separated from the organic phase and passed to distillation units to purify and concentrate the hydrogen peroxide, while the organic phase, made up essentially of the working solution, is recycled to the hydrogenator to once again commence the cycle for producing hydrogen peroxide.

The following examples are given to illustrate the invention but are not deemed to be limiting thereof.

EXAMPLE 1—RUN A

Process of the invention

An anthraquinone working solution was made up by mixing together 25% by volume of tris-(2-ethylhexyl) phosphate, and 75% by volume of a commercially available, mixed aromatic solvent containing about 99.6% aromatics, having a boiling point range of 182° C. to 204° C. obtained from Shell Chemical Company and identified as Cyclosol 63®; it had an aromatic content of about 82.3% $C_8$–$C_{12}$ alkylbenzene, 80% of which is $C_{10}$–$C_{11}$ alkylbenzene, 13.3% cycloalkylbenzene and 3.5% $C_{10}$ diaromatic (naphthalene). Thereafter 10% by weight of 2-ethylanthraquinone was dissolved in the mixed solvent.

A fixed bed catalytic hydrogenator was prepared as follows: a five-foot diameter vessel was filled with a layer of close-packed 4-inch diameter thin-walled tubes. The tubes, which had a length of only 20 inches, were placed so that they were vertically oriented and laterally positioned on a 2-mesh screen resting on the lower support of the hydrogenator vessel. Thereafter, two additional layers of identical, vertically oriented tubes were placed above the initial layer of tubes so that the total height of the tube-filled vessel was 60 inches. A relatively short tube length of 20 inches had to be employed in each of the three layers of tubes to facilitate loading and unloading, since the five-foot diameter vessel, due to design limitatons, had to be loaded and unloaded from manheads on the side of the vessel which precluded loading 60 inch length tubes.

After installing each of the three layers with 149 tubes, the tubes were filled with a hydrogenation catalyst containing about 0.3% by weight of metallic palladium dispersed uniformly over the surface of alumina supporting spheres, 2 mm. in diameter.

The above-defined working solution and an excess of gaseous hydrogen under a pressure of about 30 p.s.i.g. were passed concurrently downwardly through the catalytic hydrogenator, packed with tubes as set forth above, at a forward flow rate of 550 g.p.m. The temperature in the catalyst bed was maintained at about 52° C. All of the hydrogenated working solution recovered from the base of the hydrogenator was pumped into an oxidizing vessel.

The stream of hydrogenated working solution passed into the oxidizer was then oxidized by passing air through the working solution until oxidation of the solution was completed. The temperature of the solution in the oxidizer was maintained at from 45 to 55° C. The oxidizing working solution was removed from the oxidizer continuously and passed into an extraction unit where it was subject to water extraction to dissolve the hydrogen peroxide, preferentially, in the aqueous extract phase.

The raffinate and water extract were then permitted to separate into an organic phase and a water phase and the water phase, containing most of the hydrogen peroxide, was separated from the organic phase. The remaining organic phase, which was made up essentially of the working solution, was recycled to the hydrogenator to again commence the cycle for producing hydrogen peroxide.

The above cyclic processing was carried out for periods of at least 48 hours and the productivity of the catalyst in terms of pounds of hydrogen peroxide (100% basis) produced per 24 hour day per pound of catalyst was then determined. These results are reported in Table I.

EXAMPLE 1—RUN B

Prior art process

The procedure of Example 1, Run A was repeated in every detail except that in place of utilizing 4-inch diameter thin-walled tubes in the catalytic hydrogenator the catalyst was packed as a homogenous fixed bed without any tubes being utilized. The working solution utilized was identical and the bed temperature was maintained at 53° C. The productivity of the catalyst under these conditions is set forth in Table I.

EXAMPLE 2—RUN A

Process of the invention

The same working solution, catalyst and hydrogenator were utilized as described in Example 1, Run A. In this run, however, the downward flow of working solution through the hydrogenator vessel (concurrently with the hydrogen gas) totaled 920 g.p.m. At the base of the hydrogenator, 550 g.p.m. of the work solution was passed as forward flow directly to the oxidizer for oxidation and recovery of hydrogen peroxide; 370 g.p.m. of the work solution recovered at the base of the hydrogenator vessel was recycled back to the top of the hydrogenator. The temperature of the catalyst bed was maintained at 57° C. and the run was continued for at least 48 hours. The productivity of the catalyst is reported in Table I.

EXAMPLE 2—RUN B

The procedure of Example 2, Run A was repeated except that the hydrogenator was packed with a homogenous fixed bed of catalyst without any tubes being utilized. The rate of flow through the hydrogenator was 960 g.p.m. of which 550 g.p.m. was passed as forward flow to the oxidizer and extraction equipment for hydrogen peroxide production, while 410 g.p.m. was recycled to the top of the catalytic hydrogenator. The temperature of the catalyst bed was 57° C. The productivity of the catalyst in terms of pounds of hydrogen peroxide (100% basis) produced per 24 hour day per pound of catalyst is reported in Table I.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claim, the invention may be practiced by those skilled in the art, and having the benefit of this disclosure, otherwise than as specifically described and exemplified herein.

TABLE I

| Run | Example 1 | | Example 2 | |
| --- | --- | --- | --- | --- |
| | A | B | A | B |
| Forward flow rate, g.p.m | 550 | 550 | 550 | 550 |
| Recycle rate, g.p.m | None | None | 370 | 410 |
| Catalyst temperature, ° C | 52 | 53 | 57 | 57 |
| Productivity (lbs./$H_2O_2$/lb. catalyst/24 hrs.) | 6.31 | 4.17 | 7.43 | 4.54 |

What is claimed is:

1. In the process of producing hydrogen peroxide by the alternate reduction and oxidation of an alkylated anthraquinone as the working material dissolved in a solvent and constituting the liquid working solution, and wherein the working solution is catalytically hydrogenated by contact with hydrogen in the presence of a hyrogenation catalyst, the improvement comprising increasing the hydrogen peroxide productivity by carrying out said catalytic hydrogenation in a hydrogenator shell containing a plurality of substantially vertically oriented, laterally positioned cylinders filled with catalyst wherein the ratio of the diameter of a cylinder to the diameter of the catalyst particle is at least 15:1.

References Cited

UNITED STATES PATENTS

| | | | |
| --- | --- | --- | --- |
| 2,255,126 | 9/1941 | Myddleton | 23—1 E |
| 2,289,922 | 7/1942 | Mekler | 23—1 E |
| 3,073,680 | 1/1963 | Jenney et al. | 23—207 |
| 1,836,166 | 12/1931 | Heckenbleikner et al. | 23—288 R |

FOREIGN PATENTS

| | | | |
| --- | --- | --- | --- |
| 1,442,653 | 8/1969 | Germany | 252—477 R |

EDWARD J. MEROS, Primary Examiner

H. S. MILLER, Assistant Examiner

U.S. Cl. X.R.

23—288 R

UNITED STATES PATENT OFFICE
CERTIFICATE OF CORRECTION

Patent No. 3,755,552            Dated August 28, 1973

Inventor(s) Nathan Dean Lee and Wayne Edwin Schrock

It is certified that error appears in the above-identified patent and that said Letters Patent are hereby corrected as shown below:

Column 1, line 50, "1,158,525" should read --2,158,525--.

Column 2, line 53, "noble catalyst" should read --noble metal catalyst--.

Column 2, lines 53-54, "such as palladium or platinum, deposited on an inert catalyst", first occurrence should be deleted.

Signed and sealed this 6th day of May 1975.

(SEAL)
Attest:

RUTH C. MASON
Attesting Officer

C. MARSHALL DANN
Commissioner of Patents
and Trademarks